United States Patent
Drees et al.

(10) Patent No.: US 6,692,362 B2
(45) Date of Patent: Feb. 17, 2004

(54) DRIVING DISC FOR TRANSMITTING THE TORQUE FROM A DRIVE UNIT TO A HYDRODYNAMIC CONVERTER

(75) Inventors: Silvius Drees, Tettnang (DE); Peter Ziemer, Tettnang (DE)

(73) Assignee: ZFFFriedrichshafen AG, Friedrichshafen (DE)

(*) Notice: Subject to any disclaimer, the term of this patent is extended or adjusted under 35 U.S.C. 154(b) by 0 days.

(21) Appl. No.: 10/130,917
(22) PCT Filed: Jan. 23, 2001
(86) PCT No.: PCT/EP01/00687
§ 371 (c)(1),
(2), (4) Date: May 23, 2002
(87) PCT Pub. No.: WO01/55621
PCT Pub. Date: Aug. 2, 2001

(65) Prior Publication Data
US 2002/0184960 A1 Dec. 12, 2002

(30) Foreign Application Priority Data
Jan. 29, 2000 (DE) .......................... 100 03 925

(51) Int. Cl.$^7$ ............................ F16D 3/56; F16H 45/02
(52) U.S. Cl. ................................. 464/98; 192/200
(58) Field of Search ............................. 192/200, 207; 464/24, 98, 185

(56) References Cited

U.S. PATENT DOCUMENTS

| 4,353,444 A | * | 10/1982 | Bionaz | 192/3.29 |
|---|---|---|---|---|
| 4,523,916 A | * | 6/1985 | Kizler et al. | 464/98 |
| 5,119,911 A | * | 6/1992 | Bochot et al. | 192/3.29 |
| 5,342,242 A | * | 8/1994 | Ladd et al. | 464/98 |
| 5,616,002 A | | 4/1997 | Gärtner | 416/180 |
| 5,938,533 A | * | 8/1999 | Watanabe | 464/98 |
| 6,216,837 B1 | * | 4/2001 | Maienschein et al. | 192/3.29 |

FOREIGN PATENT DOCUMENTS

| DE | 195 22 869 A1 | 1/1997 | B60K/17/04 |
|---|---|---|---|
| EP | 0 749 861 A2 | 12/1996 | B60K/17/02 |
| EP | 0 719 393 B1 | 12/1997 | F16H/41/24 |
| WO | 95/09994 | 4/1995 | F16H/41/24 |

* cited by examiner

Primary Examiner—Lynne H. Browne
Assistant Examiner—Kenn Thompson
(74) Attorney, Agent, or Firm—Davis & Bujold, PLLC

(57) ABSTRACT

The invention concerns a driving disc for transmitting the torque from one drive unit to a hydrodynamic converter (2). The driving disc (5) has one leg (51) extending in radial direction and fastened on the output shaft (1) of the drive unit and one leg (52) extending in axial direction and fastened on supporting devices (4) of a housing (3) of the hydrodynamic converter (2). By recesses (10) spaced apart from each other in peripheral direction of the driving disc (5), there are formed in the leg (52) extending in axial direction bracket arrangements which serve to fasten the leg (52) extending in axial direction on supporting device (4) situated in the housing (3). The bracket arrangements are each formed by tongue-shaped brackets (11, 12; 11', 12') which seen in peripheral direction extend successively from both sides of the recess (10). The end areas of the brackets (11, 12; 11', 12') are each fastened on one supporting device (4).

12 Claims, 4 Drawing Sheets

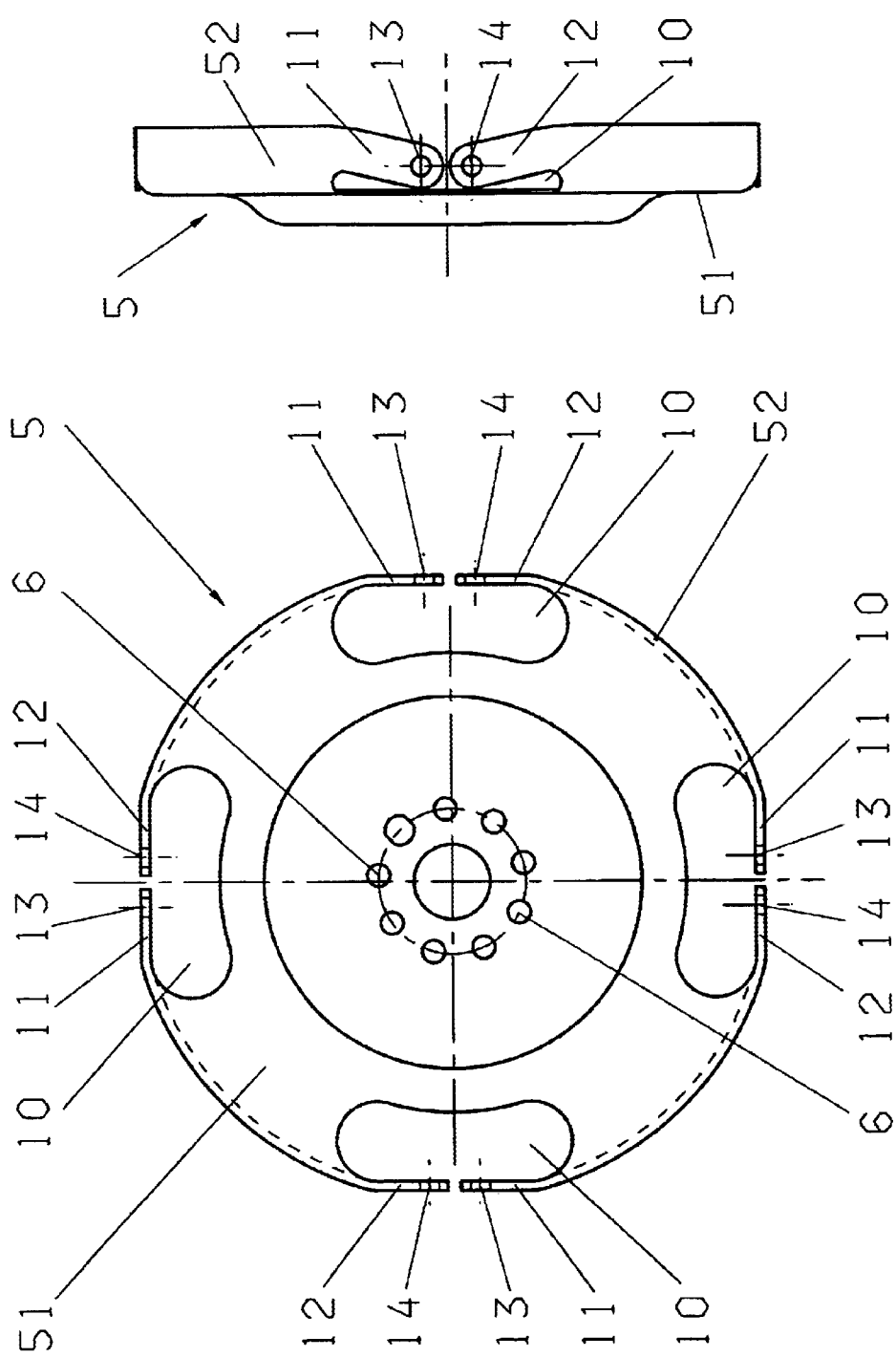

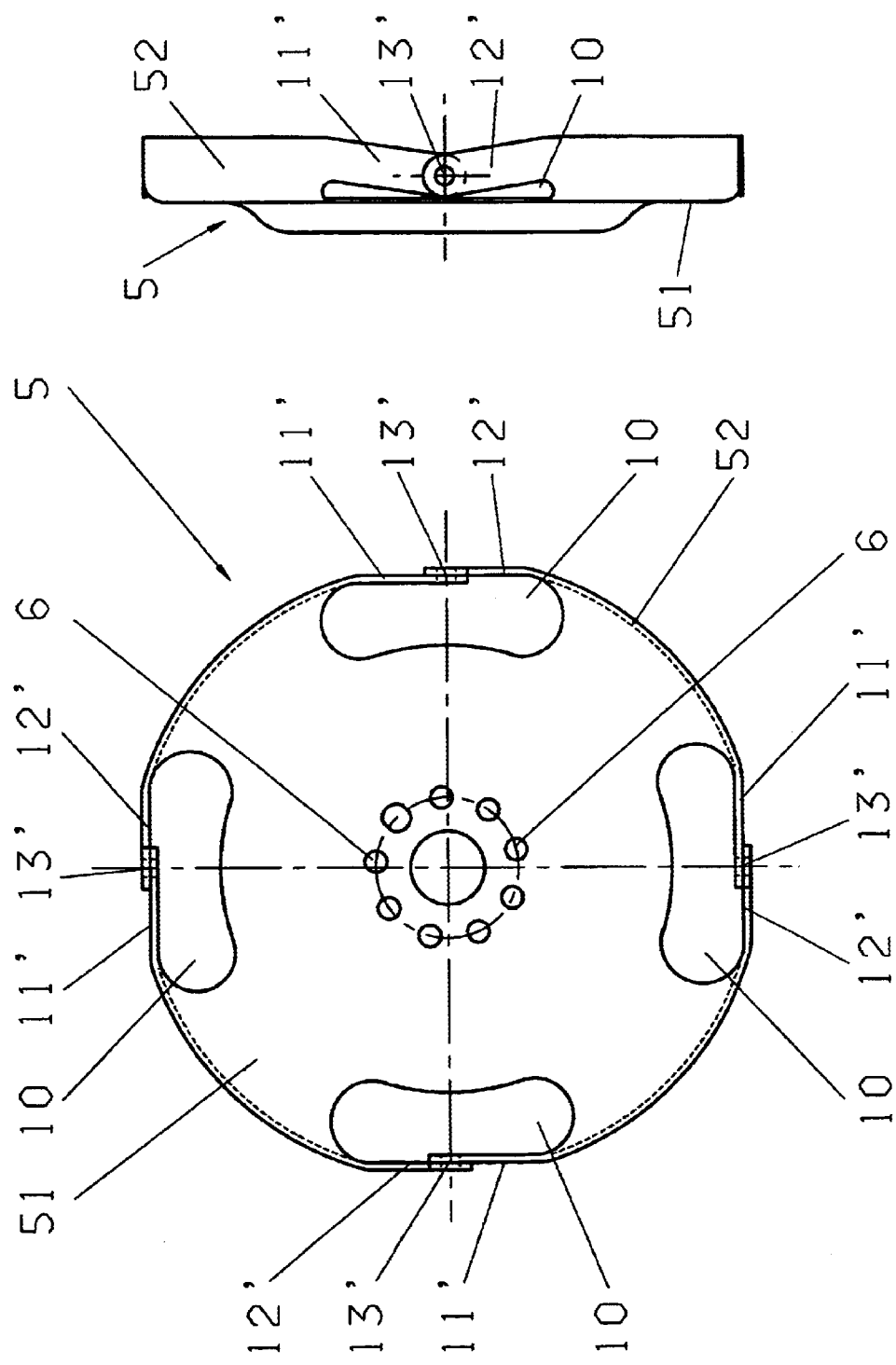

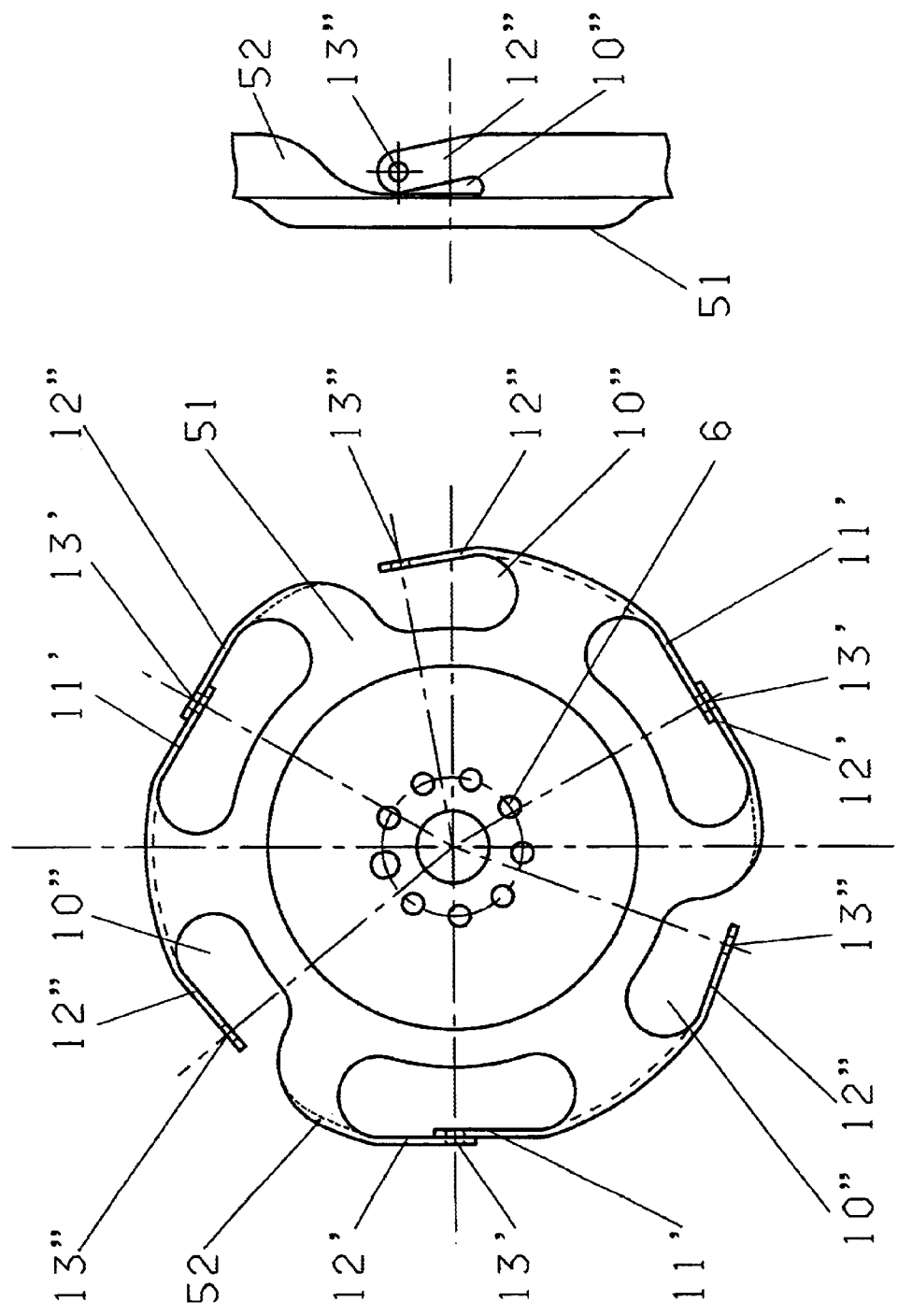

DRIVING DISC FOR TRANSMITTING THE TORQUE FROM A DRIVE UNIT TO A HYDRODYNAMIC CONVERTER

FIELD OF THE INVENTION

This invention concerns a driving disc for transmitting the torque from a drive unit to a hydrodynamic converter.

BACKGROUND OF THE INVENTION

Those driving discs for transmitting the torque from a drive unit to a hydrodynamic converter are already known. For example, from EP 0 719 393 B1 a driving disc results which is placed between a drive unit and a hydrodynamic converter and is fixed in radial direction in the converter housing by several connecting elements. The driving disc consists of two legs that define a right angle wherein one leg extends in radial direction and is radially internally screwed on the output shaft of the drive unit. The other leg has recesses extending in peripheral direction in the area of holes which are staggered in peripheral direction and through which are passed the screws which are screwed in supporting devices fastened in the converter housing. The recesses form traversing brackets where the holes are placed and which cause the driving disc to be bendable in radial direction. Thereby an increased load of the bearings of the hydrodynamic converter in an eccentric installation is prevented.

It is problematic here that the coaxiality tolerances the same as the radial tolerances occurring in the driving disc and in the supporting devices in the converter housing when screwing the very stiff brackets have to be overcome. The driving disc can be braced in the area of the brackets. In relation to the brackets tangential forces can generate which have an unfavorable effect on the service life.

A driving disc of the above mentioned kind for transmitting the torque from a drive unit to a hydrodynamic converter results from DE 195 22 869 A1. The axially extending leg connected with the supporting devices of the hydrodynamic converter and which creates the connection between the hydrodynamic converter and the drive unit has in peripheral direction holes spaced apart from each other through which are passed the bolts screwed in the supporting devices. In the area of the holes, the axially extending leg of the driving disc has recesses which, over part of the periphery, are designed as groove which, seen in peripheral direction, extends to both sides of the hole and is shaped so as to form a bracket which has in its free end area a hold for fastening on the supporting device. Hereby is also achieved a radial elasticity of the axial leg of the driving disc which prevents a misalignment between the hydrodynamic converter and the shaft of the drive unit when the bearing devices connected with the axial leg are outside the established construction position.

It is problematic here that, depending on the load direction, said brackets are stressed to traction or pressure and thus to skidding. This acts unfavorably upon the durability of the whole driving disc for torque transmission.

The problem on which this invention is based is, therefore, to provide a driving disc for transmitting the torque from a drive unit to a hydrodynamic converter by which a significant increase of the durability is achieved, and at the same time, it is possible to overcome coaxiality and radial tolerances.

The problem is solved by a driving disc for transmitting the torque which has the characteristic features of claim 1.

SUMMARY OF THE INVENTION

The essential part of this invention consists in that pressure forces that occur are significantly reduced, since the tongue-shaped brackets are designed in opposite directions. This substantially increases the durability and service life of the inventive driving disc.

Since, in the instant invention, the brackets designed to work in opposite directions are at the same time elastic, it is possible to overcome in the converter housing the coaxiality tolerances existing between the drive unit and the hydrodynamic converter, the same as radial tolerances between the driving disc and the supporting devices.

Other advantageous developments result form the subclaims.

BRIEF DESCRIPTION OF THE DRAWINGS

The invention will now be described, by way of example, with reference to the accompanying drawings in which:

FIGS. 2 and 3 are a first embodiment of the inventive driving disc;

FIGS. 4 and 5 are a second embodiment of the inventive driving disc; and

FIGS. 6 and 7 are a third embodiment of the inventive driving disc.

DETAILED DESCRIPTION OF THE INVENTION

Figure 1:
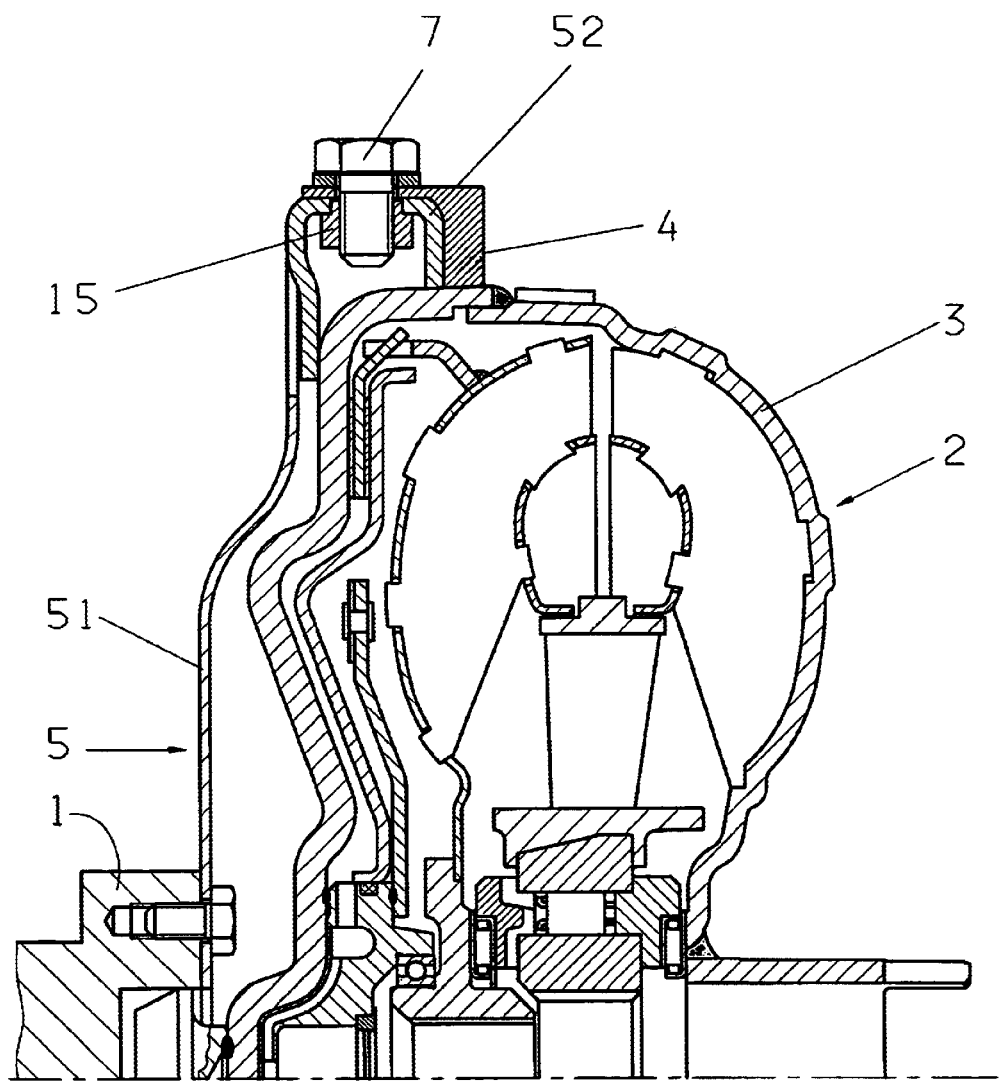
FIG. 1 is a section through a driving disc fastened to a hydrodynamic converter.

FIG. 1 shows a section through an arrangement for torque transmission from one drive unit to a transmission having a hydrodynamic converter. With 1 is designated here the implement shaft of a drive unit (not shown). What is involved here, by way of example, is the crankshaft of an internal combustion engine. With 2 is designated the hydrodynamic converter which, in a manner known per se, has one impeller, one turbine wheel and one rotor in a housing 3 which are not specifically designated. Several supporting devices 4 are connected with the housing 3 of the hydrodynamic converter 2.

To connect the hydrodynamic converter 2 with the output shaft 1 of the drive unit, a driving disc 5 is provided which has a first leg 51 extending in a radial direction in the form of a disc part and a second leg 52 extending in an axial direction in the form of a flange. The legs 51 with 52 form a right angle. By its free end, the leg 51 is non-rotatably connected with and axially fixed to the output shaft 1 of the drive unit. The leg 51 preferably has, on its radially internal end, holes 6 for screwing on the output shaft 1.

The leg 52 can also be fixed on the supporting devices 4 with the aid of other fastening elements. Rivets, bolts and pins, for example, are also preferably suited for this purpose.

The torque is thus transmitted from a drive unit (not shown on the output shaft 1 thereof), via the legs 51, 52 of the driving disc 5, and the fastening devices 7 to the housing 3 of the hydrodynamic converter 2.

According to FIGS. 2 and 3, the instant driving disc 5 for transmitting the torque has in the radially extending leg 51 of the driving disc 5, on the side facing the axial leg 52, recesses 10 evenly distributed over the periphery of the driving disc 5. The recesses extend in axial direction for a predetermined distance into the axial leg, that is, they pass over the right angle formed between the legs 51, 52.

According to FIG. 2, the driving disc 5 has, for example, four recesses.

In the manner that can be seen from FIGS. 2 and 3, in the axial leg 52 of the driving disc 5, in the area of each recess 10, there are formed two tongue-shaped brackets 11, 12 which extend one after the other proceeding from the sides of the recess 10.

The free ends of the successively extending brackets 11 and 12 are spaced apart from each other. In the end area of each bracket 11, 12 is located one opening 13, 14 through which can be passed the devices for fastening the axial leg 52 of the driving disc 5 on the supporting devices 4 of the housing 3 of the hydrodynamic converter 2. According to FIG. 1, the fastening devices preferably are screws 7 screwed to the supporting devices 4. This means that, in the case of the embodiment of FIGS. 2 and 3, each supporting device 4 has two openings By the described bracket arrangement, it is obtained in the area of the recesses 10 that the driving disc 5 is flexible in radial direction so as to prevent an increased loading of the bearings of the converter 2 resulting from an eccentric installation.

In FIGS. 4 and 5 is shown one other embodiment essentially corresponding to the embodiment of FIGS. 2 and 3. However in the embodiment of FIGS. 4 and 5, the end area of the successively extending brackets 11' and 12' overlap, there being provided a single common opening 13' in the overlapping zone of the brackets 11' and 12' which serves to fasten the axial leg 52 of the driver disc 5 on the supporting devices 4. This embodiment understandably has the advantage of requiring only half of the screws 7 which results in a reduction of cost. The corresponding assembly expenditure also diminishes at the same time.

FIGS. 6 and 7 finally show an embodiment where, together with the bracket arrangements according to the embodiment of FIGS. 4 and 5, there are also provided bracket arrangements in which only a single bracket 12" with an opening 13" extends in one direction for the fastening. Here are provided between each two bracket arrangements with brackets 11', 12' extending in opposite directions, an arrangement with only one bracket 12" extending in one direction. This embodiment has the advantage that it is possible to take into account the different load levels in the traction and push operation of the internal combustion engine, since the number of brackets 12' in one direction is different from the number of brackets 12" in the other direction.

Attention is drawn to the fact that, in the embodiment of FIGS. 6 and 7, instead of the bracket arrangements with the brackets 11' and 12', there also can be provided bracket arrangements with the brackets 11 and 12 according to FIGS. 2 and 3.

| Reference numerals |
| --- |
| 1 output shaft of a drive unit |
| 2 converter |
| 3 housing |
| 4 supporting device |
| 5 driver disc |
| 6 hole |
| 7 screw |
| 10 recess |
| 11 bracket |
| 12 bracket |
| 13 opening |
| 14 opening |
| 51 leg |

| -continued |
| --- |
| Reference numerals |
| 52 leg |
| 11' bracket |
| 12' bracket |
| 13' opening |
| 10" recess |
| 12" bracket |
| 13" opening |

What is claimed is:

1. A driving disc for transmitting the torque from a drive unit to a hydrodynamic converter (2); the driving disc (5) having a first leg (51), extending in a radial direction, with a radially inner surface thereof fastened to an output shaft (1) of the drive unit and, a second leg (52) is integral with a periphery of the first leg (51) and the second leg (52) extends axially and is connected to a supporting device (4) attached to a housing (3) of the hydrodynamic converter (2);

wherein the second leg (52) defines a pluarality of spaced apart peripheral recesses (10) located about a periphery of the driving disc (5), and the second leg (51) has a plurality of tongue-shaped brackets (11, 12; 11', 12') formed therein and each recess has a pair of tongue-shaped brackets (11, 12; 11', 12') which extend from opposite sides of the recess (10) toward one another and are attached to the supporting device (4) of the housing (3).

2. A driving disc for transmitting torque from a drive unit to a hydrodynamic converter (2); the driving disc (5) having a first leg (51), extending in a radical direction, with a radially inner surface thereof fastened to an output shaft (1) of the drive unit and, a second leg (52) is integral with a periphery of the first leg (51) and the second leg (52) extends axially and is connected to a supporting device (4) attached to a housing (3) of the hydrodynamic converter (2);

wherein the second leg (52) defines a plurality of spaced apart peripheral recesses (10) located about a periphery of the driving disc (5), and the second leg (51) has a plurality of tongue-shaped brackets (11, 12; 11', 12') formed therein and each recess has a pair of tongue-shaped brackets (11, 12; 11', 12') which extends from opposite sides of the recess (10) toward one another and are attached to the supporting device (4) of the housing (3); and remote free ends of each tongue-shaped bracket (11, 12; 11', 12') each have an opening therein and a removable fastening element (7) passes through each opening of the pair of tongue-shaped brackets (11, 12; 11', 12') for fastening the driving disc (5) to the supporting device (4) of the housing (3).

3. The driving disc according to claim 1, wherein the recesses (10) formed in the second leg (52) extend axially about a circumference of the second leg (52).

4. The driving disc according to claim 2, wherein remote free ends of each tongue-shaped bracket (11, 12; 11', 12') each have an opening therein, the remote free ends of the pairs of tongue-shaped brackets (11, 12) are spaced apart from one other, and a removable fastening element (7) passes through each opening of the pair of tongue-shaped brackets (11, 12; 11', 12') for fastening the driving disc (5) to the supporting device (4) of the housing (3).

5. The driving disc according to claim 1, wherein remote free ends of each tongue-shaped bracket (11, 12; 11', 12') each have an opening therein, the remote free ends of the pairs of tongue-shaped brackets (11', 12') overlap one another to form a common opening (13') in the pair of tongue-shaped brackets (11', 12'), and the fastening element (7) passes through the common opening (13') to fasten the overlapped pair of tongue-shaped brackets (11', 12') to the supporting device (4).

6. The driving disc according to claim 5, wherein the second leg (52) defines a plurality of further recess (10") therein with one of the plurality of further recess (10") being formed between adjacent peripheral recesses (10), a single further tongue-shaped bracket (12") extends in an axial direction from one side of the further recess (10) toward an opposite side thereof into the further recess (10"), and an opening (13") is provided in the remote free end of the further tongue-shaped bracket (12") through which one of the plurality of fastening elements (7) can be passed for fastening further tongue-shaped bracket (12") to the supporting device (4).

7. The driving disc according to claim 1, wherein the recesses (10) are evenly distributed about the periphery of the driving disc (5).

8. The driving disc according to claim 2, wherein the opening formed in each tongue-shaped bracket (11, 12; 11', 12') has an axis which extends in the radial direction.

9. A driving disc for transmitting torque from a drive unit to a hydrodynamic converter (2); the driving disc (5) having a first leg (51), extending in a radial direction, with a radially inner surface thereof fastened to an output shaft (1) of the drive unit and, a second leg (52) is integral with a periphery of the first leg (51) and the second leg (52) extends axially and is connected to a supporting device (4) attached to a housing (3) of the hydrodynamic converter (2);

wherein the second leg (52) defines a plurality of spaced apart peripheral recesses (10) located about a periphery of the driving disc (5), and the second leg (51) has a plurality of tongue-shaped brackets (11, 12; 11', 12') formed therein and each recess has a pair of tongue-shaped brackets (11, 12; 11', 12') which extend from opposite sides of the recess (10) toward one another and are attached to the supporting device (4) of the housing (3); and remote free ends tongue-shaped bracket (11, 12; 11', 12') each have an opening therein, the remote free ends of the pairs of tongue-shaped brackets (11', 12') overlap one another to form a common opening (13') in the pair of tongue-shaped brackets (11', 12'), and the fastening element (7) passes through the common opening (13') to fasten the overlapped pair of tongue-shaped brackets (11', 12') to the supporting device (4).

10. The driving disc according to claim 9, wherein the recesses (10) are evenly distributed about the periphery of the driving disc (5).

11. The driving disc according to claim 9, wherein the recesses (10) formed in the second leg (52) extend axially about a circumference of the second leg (52).

12. The driving disc according to claim 9, wherein the second leg (52) defines a plurality of further recess (10") therein with one of the plurality of further recess (10") being formed between adjacent peripheral recesses (10), a single further tongue-shaped bracket (12") extends in an axial direction from one side of the further recess (10) toward an opposite side thereof into the further recess (10"), and an opening (13") is provided in the remote free end of the further tongue-shaped bracket (12") through which one of the plurality of fastening elements (7) can be passed for fastening further tongue-shaped bracket (12") to the supporting device (4).

* * * * *